Patented Mar. 4, 1952

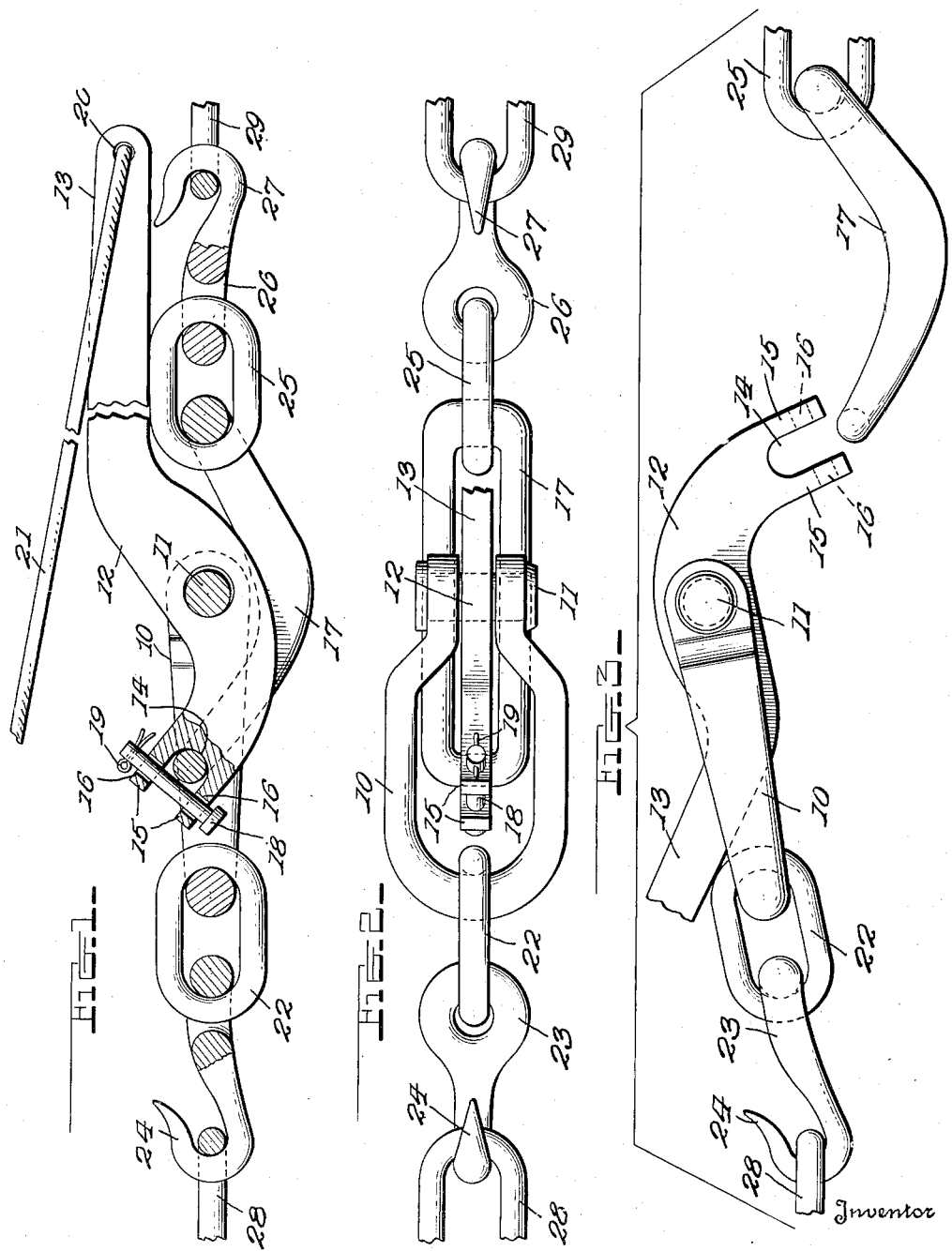

2,587,874

UNITED STATES PATENT OFFICE 2,587,874

LOAD BINDER

Fred A. Mockel, Kettle Falls, Wash.

Application February 15, 1949, Serial No. 76,460

1 Claim. (Cl. 24—68)

The present invention relates to load binders and it consists in the combinations, constructions and arrangements of parts herein described and claimed.

Generally the invention comprises a load binder having a principal shackle to which is pivoted an operating lever having a notch at its inner end for the reception of an arcuate shackle member. Hooks are connected by means of links with the shackle members for drawing together the ends of a cable, cord, chains or the like. A lock pin extends through that end of the lever having the notch formed therein whereby the pin may be utilized to lock the arcuate shackle member to the inner end of the operating lever. The outer end of the operating lever has attached thereto an operating cord whereby the device may be unlocked from a remote position thereby providing a safety factor for the operator of the device.

It is accordingly an object of the invention to provide a device of the character set forth which is simple in its construction and operation and yet effective and efficient in use.

Another object of the invention is the provision of a locking pin forming a part of the invention and providing novel and releasable means for connecting an operating lever also forming a part of the invention to an arcuate shackle member likewise forming a part of the invention.

Another object of the invention is the provision, in a device of the character set forth, of remotely controlled means for locking the same.

Other and further objects of the invention will become apparent from a reading of the following specification taken in conjunction with the drawing, in which:

Figure 1 is an elevational view, partly broken away, of an embodiment of the invention, Figure 2 is a plan view thereof, and Figure 3 is a fragmentary elevational view, partly exploded, illustrating the operation of the device forming the invention.

Referring more particularly to the drawings, there is shown therein a safety load binder having a main shackle 10 whose inner ends are interconnected by means of a bolt 11 or the like. Upon the bolt is loosely pivoted an operating lever 12 having an extended handle 13 at its outer end and having a recess 14 at its inner end. The recess 14 thereby forms a pair of arms 15 in the inner end of the lever 12 each of which is provided with an opening 16.

One end of an arcuate shackle member 17 is adapted to be placed in the recess 14 and a lock pin 18 extends through the openings 16 and is provided with a cotter pin 19 for locking the same in the arms 15.

The handle 13 is provided with an opening 20 in which may be fastened one end of a pull cord 21. A link 22 interconnects the shackle 10 and an eye 23 of a hook 24. A link 25 interconnects the arcuate shackle member 17 and an eye 26 of a hook 27. The hooks 27 and 24 are utilized to connect the ends of, for example, a chain 28 and 29, and the same may, of course, be utilized to interconnect a cable, rope or the like.

In operation, it will be apparent that in order to draw the ends of the chain 28 and 29 together, it is only necessary to hook the same with the hooks 24 and 27, after which the arcuate shackle member 17 is engaged in the recess 14 and the lock pin 18 inserted into the openings 16, after which the cotter pin is inserted into the inner end of the lock pin 18. The handle 13 is then moved in a clockwise direction as viewed in Figure 1 thereby drawing the ends of the chain 28 and 29 together. It will be noted that when it is desired to unfasten the binder member such as the chain 28, 29, et cetera, that it is only necessary for the operator of the device to take the free end of the cord 21 and to pull the same to turn the handle 13 in a counterclockwise direction as viewed in Figure 1. The lock pin 18 first having been removed from the device, the device will then come apart as shown in Figure 3, without endangering the operator thereof. It will also be noted that the pin 18 may be removed at any time due to the fact that it is not under pressure from any other element of the invention.

In other words, when the binder is in clamped position with the parts thereof in the relation shown in Figs. 1 and 2 of the drawing, all pressure of the arcuate shackle 17 is on the inner end of the slot 14. Thus the pin 18 can be removed without disturbing the locked relation of the main shackle 11, lever 12 and arcuate shackle 17. After removal of the lock pin 18, the device will come apart in the manner previously described.

While but one form of the invention has been shown and described herein, it will be readily apparent to those skilled in the art that many minor modifications may be made without departing from the spirit of the invention or the scope of the appended claim.

What is claimed is:

A binder of the character described comprising a main shackle, a lever pivotally connected with the main shackle, an arcuate shackle and means for latching the lever with the arcuate shackle, said means including a recess at the inner end of said lever for receiving the arcuate shackle therein and a removably mounted lock pin for retaining the arcuate shackle in said recess, whereby when said binder is in clamped position, pressure will be exerted on the inner end of said recess to allow removal of said lock pin.

FRED A. MOCKEL.

REFERENCES CITED

The following references are of record in the file of this patent:

UNITED STATES PATENTS

| Number | Name | Date |
|---|---|---|
| 952,773 | Welty | Mar. 22, 1910 |
| 1,332,719 | Evenson | Mar. 2, 1920 |
| 2,359,492 | Rockwood et al. | Oct. 3, 1944 |